US012308793B2

(12) United States Patent
Baird

(10) Patent No.: US 12,308,793 B2
(45) Date of Patent: May 20, 2025

(54) SOLAR PANEL WIRE MANAGEMENT SYSTEM AND METHOD

(71) Applicant: Doug Baird, Vidalia, GA (US)

(72) Inventor: Doug Baird, Vidalia, GA (US)

( * ) Notice: Subject to any disclaimer, the term of this patent is extended or adjusted under 35 U.S.C. 154(b) by 947 days.

(21) Appl. No.: 16/392,372

(22) Filed: Apr. 23, 2019

(65) Prior Publication Data
US 2020/0343855 A1 Oct. 29, 2020

(51) Int. Cl.
*H02S 40/36* (2014.01)
*H02S 20/23* (2014.01)
*H02S 99/00* (2014.01)

(52) U.S. Cl.
CPC .............. *H02S 40/36* (2014.12); *H02S 20/23* (2014.12); *H02S 99/00* (2013.01)

(58) Field of Classification Search
CPC .... H02S 20/23–24; H02S 30/10; H02S 40/30; H02S 40/36; H02S 40/34
See application file for complete search history.

(56) References Cited

U.S. PATENT DOCUMENTS

| | | | | |
|---|---|---|---|---|
| 5,639,049 A | * | 6/1997 | Jennings | F16L 3/123 248/301 |
| 2012/0227791 A1 | * | 9/2012 | Vari | H02S 20/10 136/251 |
| 2012/0301661 A1 | * | 11/2012 | West | F24S 40/10 428/99 |
| 2013/0075152 A1 | * | 3/2013 | Mazzone | H02G 3/04 174/481 |
| 2013/0139869 A1 | * | 6/2013 | Nuernberger | H02S 20/24 136/251 |
| 2014/0158184 A1 | * | 6/2014 | West | H02S 20/23 136/251 |
| 2016/0258554 A1 | * | 9/2016 | Ripoll Agullo | F16L 3/1033 |
| 2018/0337627 A1 | * | 11/2018 | Tomlinson | H02S 40/34 |
| 2020/0366238 A1 | * | 11/2020 | Schimpf | H02G 3/34 |
| 2022/0200523 A1 | * | 6/2022 | Truthseeker | H02S 30/10 |

* cited by examiner

*Primary Examiner* — Daniel P Malley, Jr.
(74) *Attorney, Agent, or Firm* — Fishman Stewart PLLC

(57) ABSTRACT

A wire management system for solar panel installations includes elongated members, each with a length and back, bottom and front panels. The front panel is angled toward the back panel so as to provide a gap into a elongated channel configured to receive electrical wiring and connectors associated with the solar panel installation. The various panels may be flat but for the transitions, which are smooth and continuous. The elongated member may be extruded from a single piece of sheet metal, and the bottom panel may include holes or slots to drain water. The back panel may include holes to receive fasteners for mounting the back panel against an existing rack or rail associated with the solar panel installation. Also disclosed is a method of organizing the wiring associated with a solar panel installation including a plurality of solar panels mounted to racks or rails fastened to a roof surface.

18 Claims, 6 Drawing Sheets

SOLAR PANEL WIRE MANAGEMENT SYSTEM AND METHOD

FIELD OF THE INVENTION

This invention relates generally to solar panels and, in particular, to a system for managing the cables and wires that interconnect multiple solar panels, including solar panels used for rooftop installations.

BACKGROUND OF THE INVENTION

Rooftop solar panel installations typically use metal rails to mount multiple panels in arrays. As shown in FIG. 1, such installations may use racking rails 102, typically constructed of extruded aluminum, which have a lengthwise upper groove 104 and a lengthwise side groove 104. Both of these grooves may include opposing lips such as 108, 110, to provide surfaces to retain other mounting components. For example, upper lengthwise groove 104 may be configured to receive L-shaped clamps 112 to hold solar panels 120 against the upper surfaces of the rails 102 using threaded fasteners 113. Similarly, side groove 106 may include lips 107, 109 to retain an L-shaped component 114 that uses a fastener 116, 118 to secure the rails 102 to a rooftop surface. The side 103 opposite the side containing lengthwise groove 106 is typically featureless, as shown.

FIG. 2 shows two racking rails 202, 204, supporting a single collector 220, with the understanding that other panels (not shown) would be supported next to one another. Output power cables extend from the bottom of each panel through one or more regions 206, 208. In accordance with existing installation practice, these wire harnesses 212, 212, which include Molex-type connectors 216, 218, are simply dressed in ad hoc fashion along the sides of the rails 202, 204. Usually wire ties are used for this purpose, and not all are rated for 25 years. They are cumbersome and labor intensive to install and erode over time. The result is an unsightly arrangement of exposed wires and cables that can be seen by the owner.

SUMMARY OF THE INVENTION

This invention is directed to a wire management system for solar panel installations. The system allows the installer to work faster, more efficiently, and with a cleaner install without allowing wires to hang down and touch the hot roof.

The wire-management system comprises one or more elongated members, each having a predetermined length, and wherein, in cross section, each member includes back, bottom and front panels. The back panel has a top edge and a bottom edge. The bottom panel has a back edge and a front edge, and wherein the back edge of the bottom panel transitions to the bottom edge of the back panel. The front panel has a bottom edge and a top edge, and wherein the bottom edge of the front panel transitions to the front edge of the bottom panel. The distance from the bottom panel to the top edge of the back panel is greater than distance from the bottom panel to the top edge of the front panel, such that the cross section roughly forms a "J" shape when viewed from one end. The front panel is angled toward the back panel so as to provide a gap into a elongated channel to receive electrical wiring and connectors associated with the solar panel installation.

In the preferred embodiment, the various panels are flat but for the transitions, which are smooth and continuous. The front panel is angled toward the back panel, and the upper edge of the front panel is angled away from the back panel to form a lip having a smooth back surface to reduce interference as electrical wiring and connectors are inserted into the channel. The gap between the smooth back surface of the curved lip and the back panel may be between ¼" and 1 inch, more preferably ¾" or thereabouts to received wiring and connectors associated with typical solar panel installations. The elongated member may be extruded from a single piece of sheet metal, and the bottom panel may include holes or slots to drain water. The back panel may include holes to receive fasteners for mounting the back panel against an existing rack or rail associated with the solar panel installation.

Also disclosed is a method of organizing the wiring associated with a solar panel installation including a plurality of solar panels mounted to racks or rails fastened to a roof surface. In accordance with such a method, one or more of the elongated members are provided, with the back panel of each elongated member being fastened to one of the racks or rails of the existing solar panel installation. The wires and connectors associated with the existing solar panel installation may then be inserted into the elongated channel of the elongated members. The length of each elongated member may correspond to the width of the solar panels used in the installation. For example, the length may be equal or slightly less than the width of the panels.

DETAILED DESCRIPTION OF THE INVENTION

Figure 3:
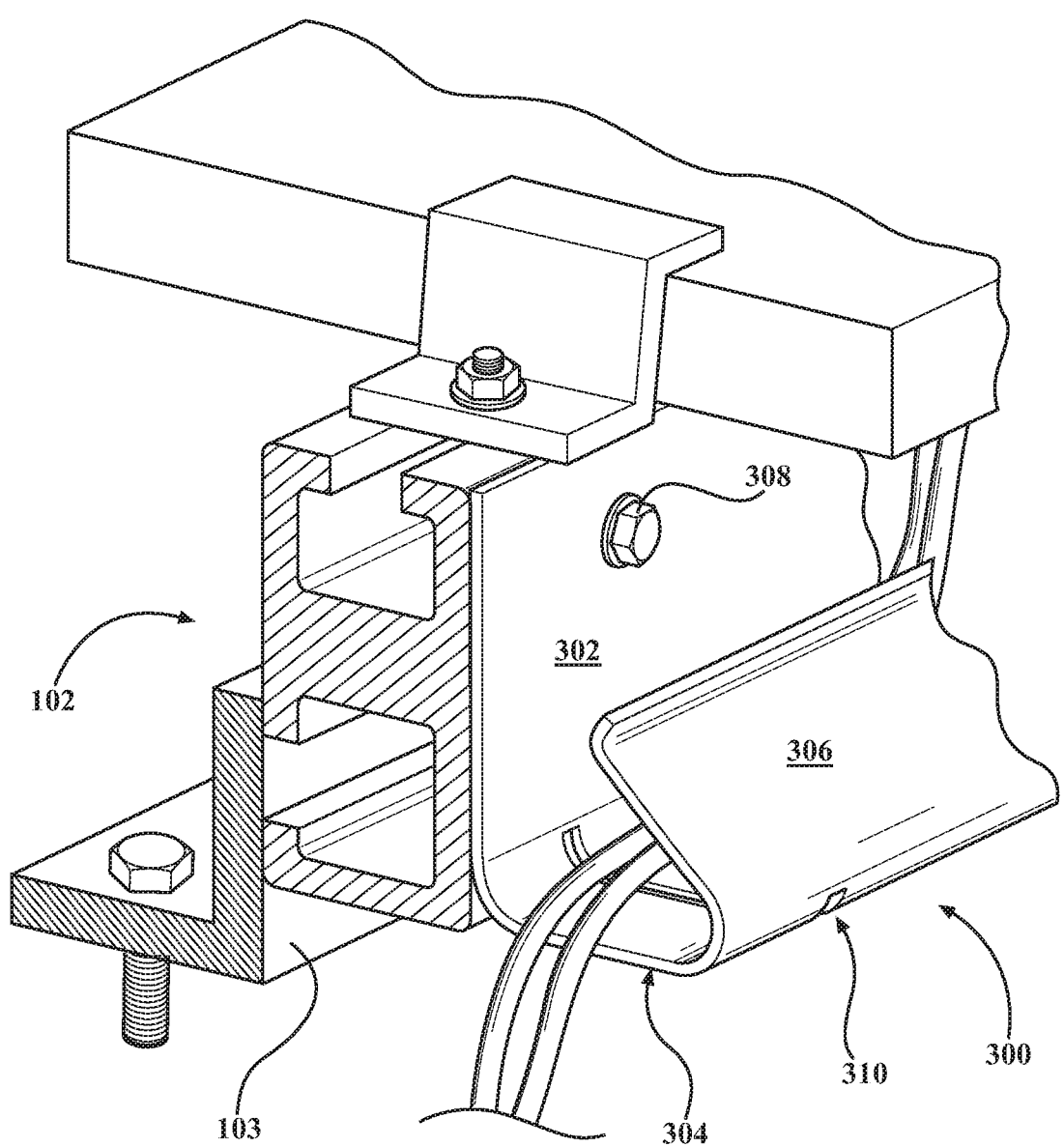
FIG. 3 illustrates a preferred embodiment of the invention comprising a wire management "tray" that organizes and conceals otherwise exposed wiring in solar panel installations.
Figure 4A:
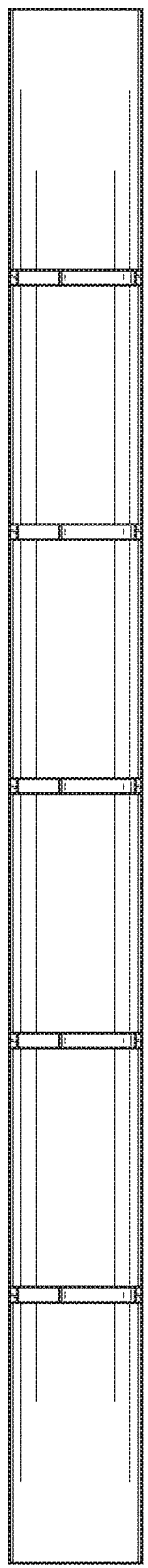
FIG. 4A is a bottom view drawing that illustrates one set of possible dimensions associated with a preferred embodiment.
Figure 4B:
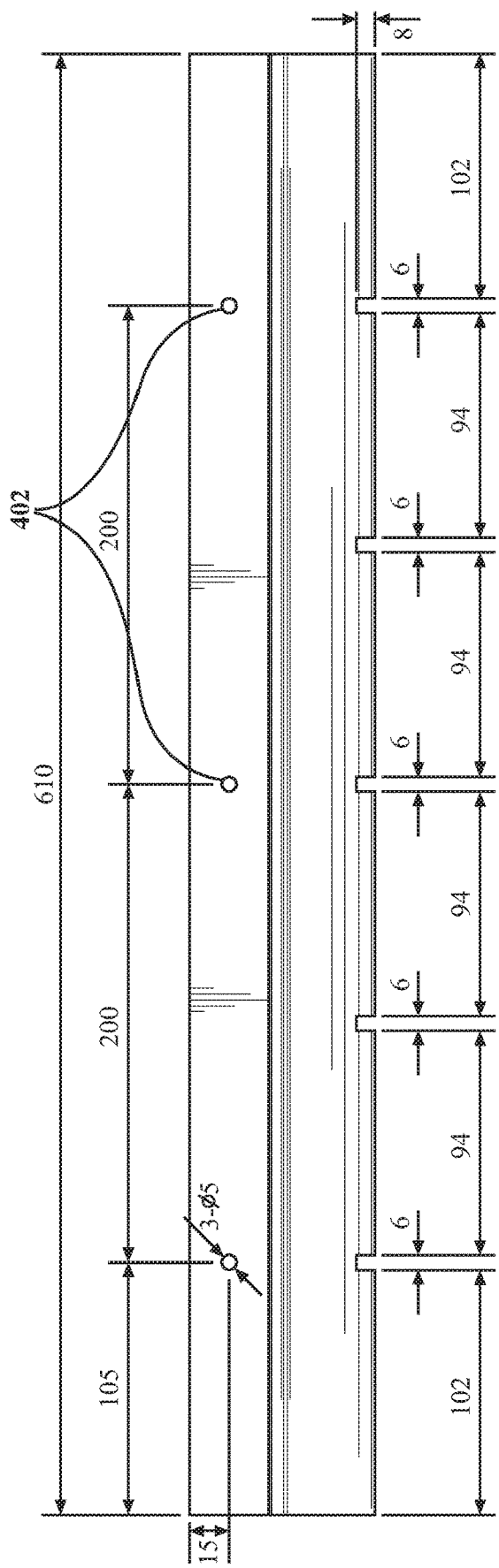
FIG. 4B is a front view of the embodiment of FIG. 4A.
Figure 4C:
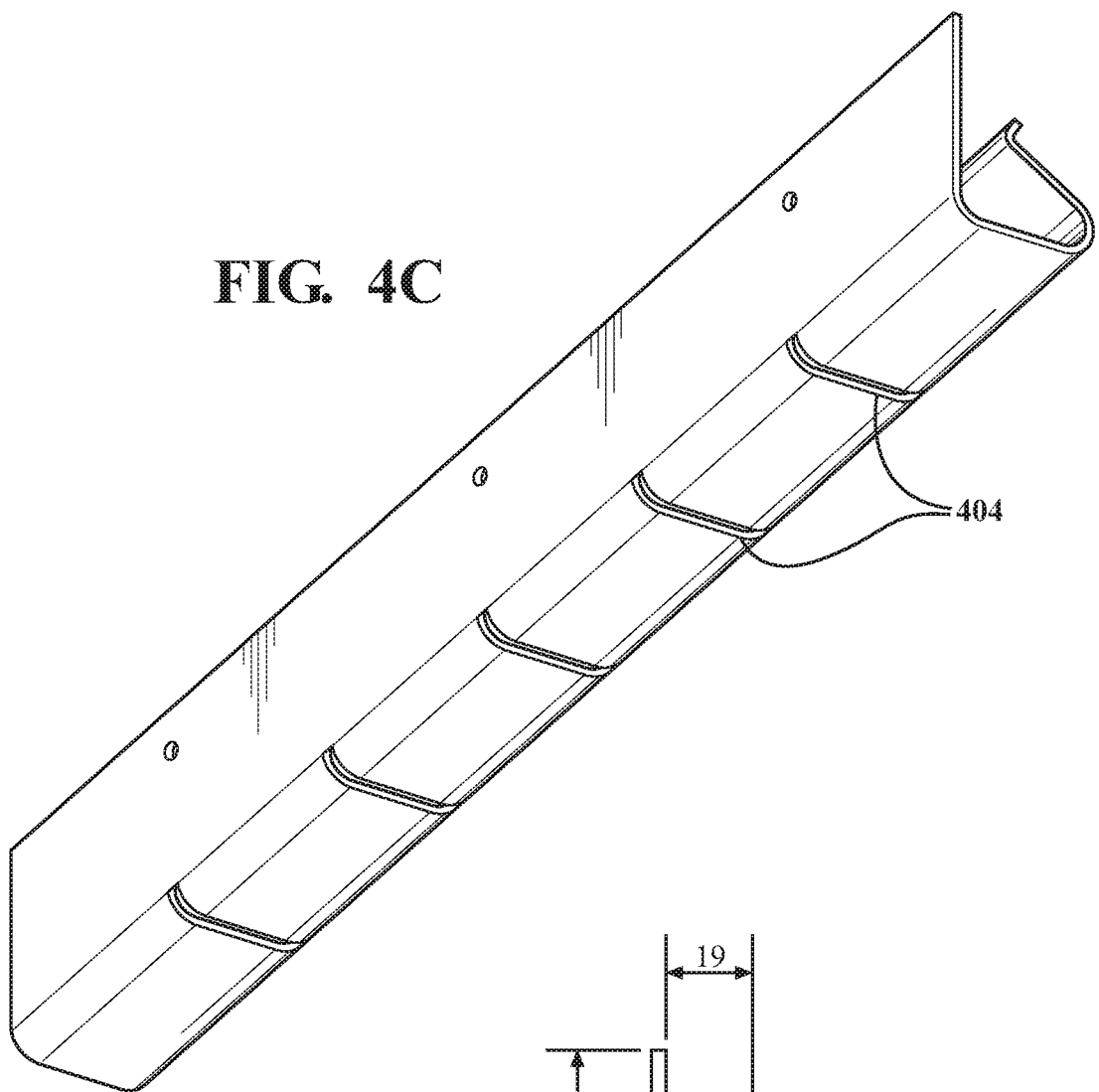
FIG. 4C is a bottom oblique view of the embodiment of FIG. 4A.
Figure 4D:
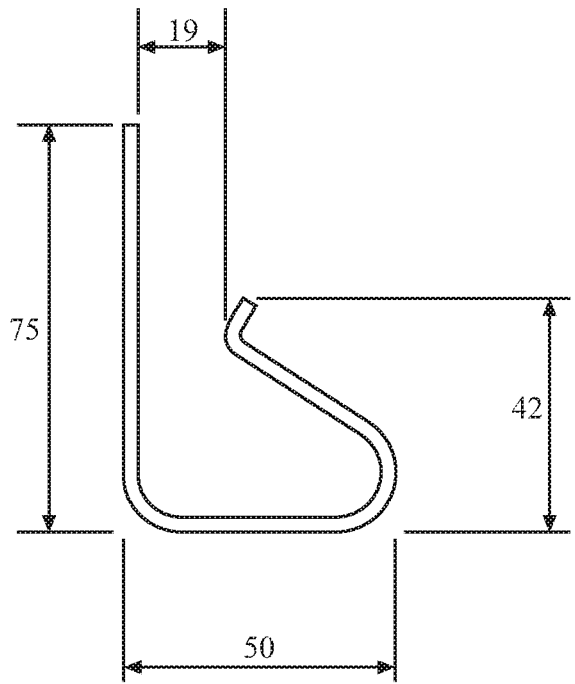
FIG. 4D is a side, edge view of the embodiment of FIG. 4A.

This invention solves the problem of exposed, disorganized wiring in solar panel installations by providing a wire management "tray" 300 depicted in FIG. 3. This tray, preferably constructed from a piece of bent or extruded rust-resistant metal such as aluminum or stainless steel, include a wall 302 configured for mounting against surface 103 of rail 102. The tray 300 further includes a bottom 304 that transition upwardly to an S-shaped edge 306, leaving a gap dimensioned to receive the loose wires to and from each collector panel. The wall 302 may include spaced-apart holes enabling fasteners 308 to connect the tray to rails 102. The tray my further include a plurality of spaced apart holes, slots, or cut-outs to facilitate water drainage.

FIGS. 4A-D are drawings that illustrate one possible set of dimensions, which are in millimeters. While the article can be any length, the length of 610 mm (35.827 inches) is selected to be just less than a 36" wide panel, such that 2 tray are used per panel with slight gaps between. Also, the gap of 19 millimeters (just less than ¾") was chosen so that the connecters used in solar panel installations, just fit through the gap while being resistant to coming out. In particular, many solar panel installations use MC4 connectors which are generally cylindrical and have a diameter of 18.8 mm. Accordingly, this gap may be in the range of 18 to 20 mm (or more) or, more particularly, 18-19 mm.

Figure 1:
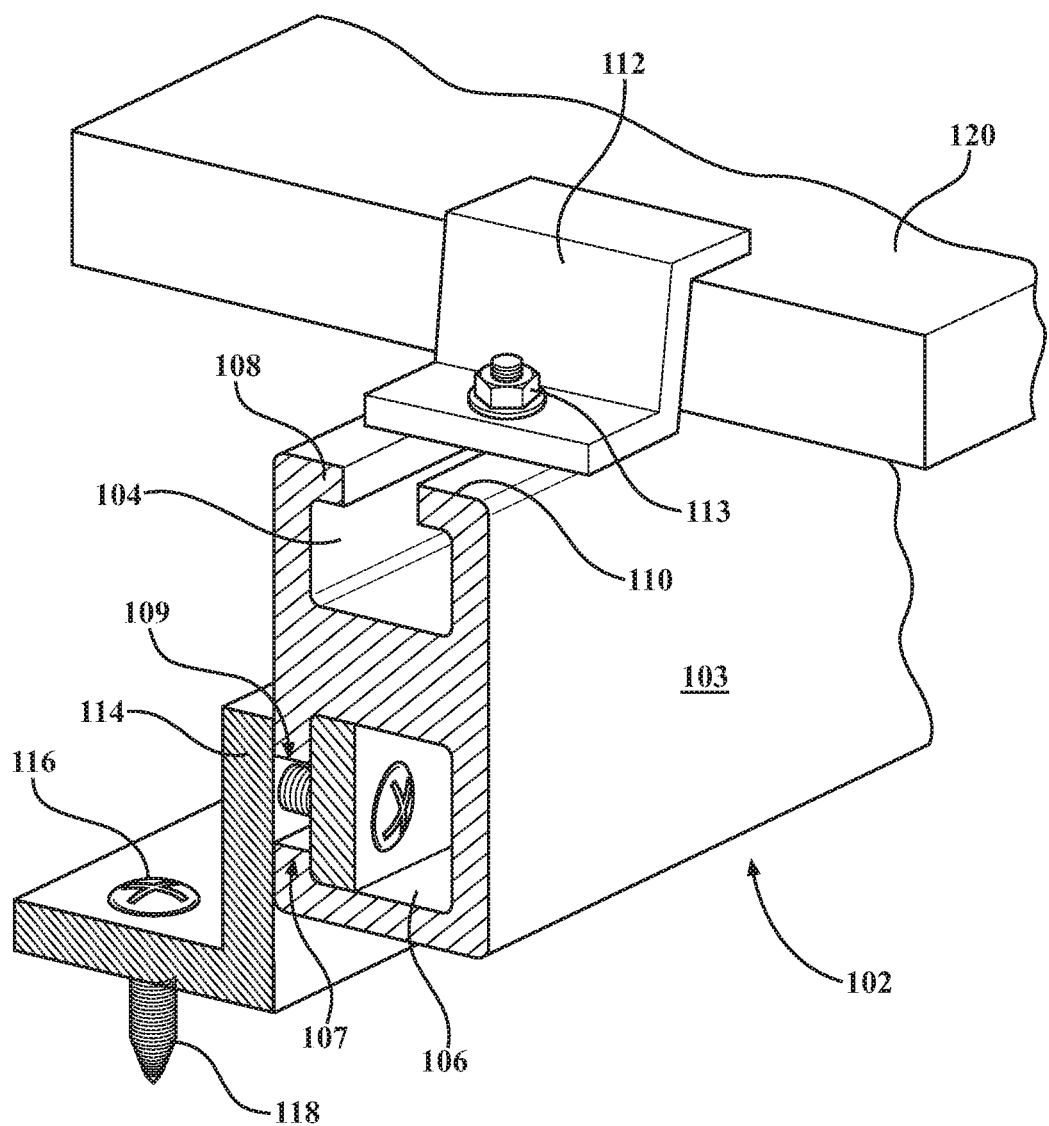
FIG. 1 is a drawing that shows a typical prior-art rooftop solar panel installation that uses metal rails to mount an array of multiple panels.
Figure 2:
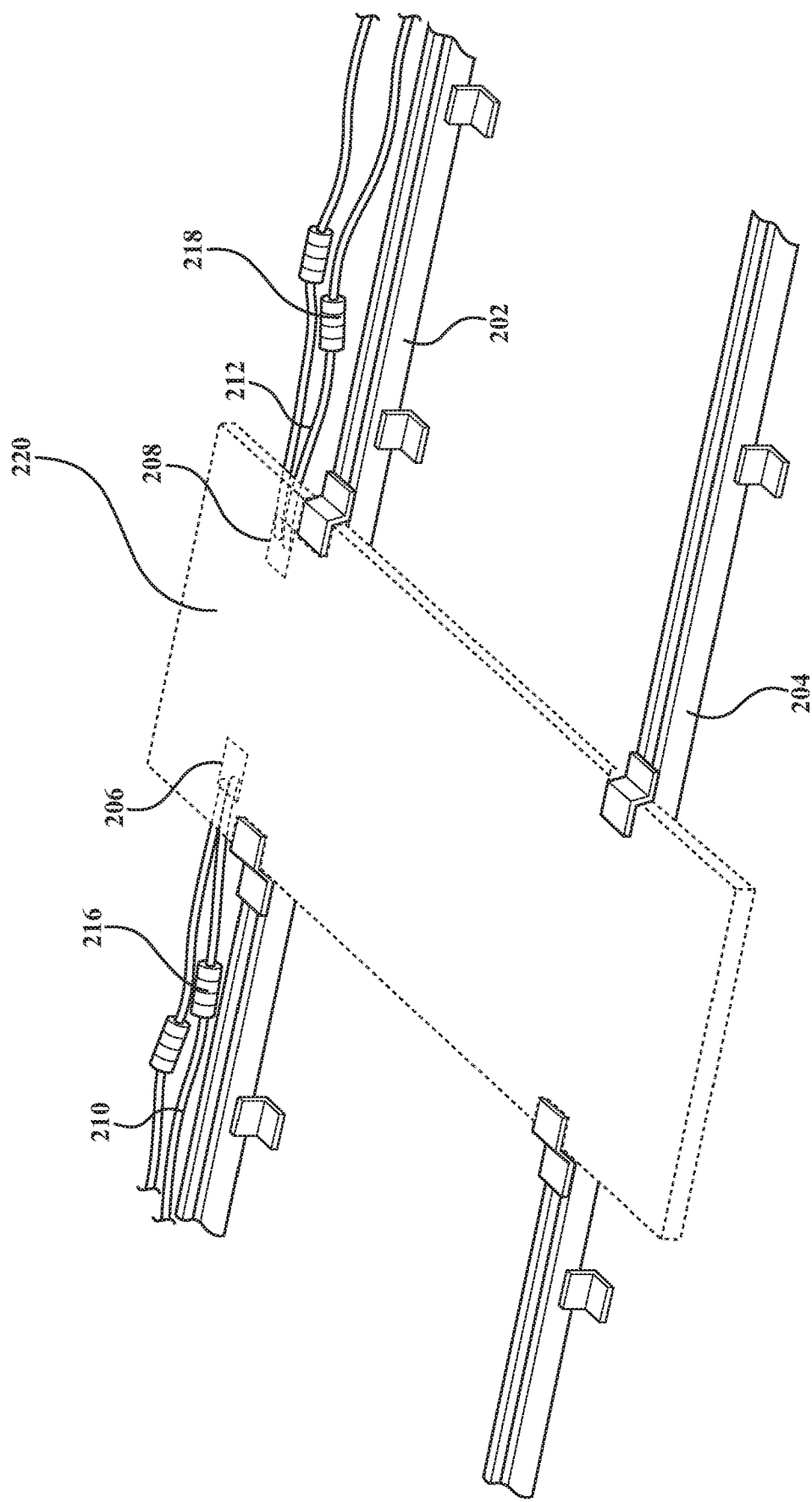
FIG. 2 shows two racking rails supporting a single collector, with the understanding that other panels (not shown) would be supported next to one another.

The size and spacing of mounting holes 402 and slots 404 are essentially arbitrary. Note further that the invention is not limited in terms of the racking system used for the panel installation. That is, while the trays are particularly suited to the mounting hardware shown in FIG. 1, other types of rails may be used so long as the trays may be suitably mounted.

Figure 5:
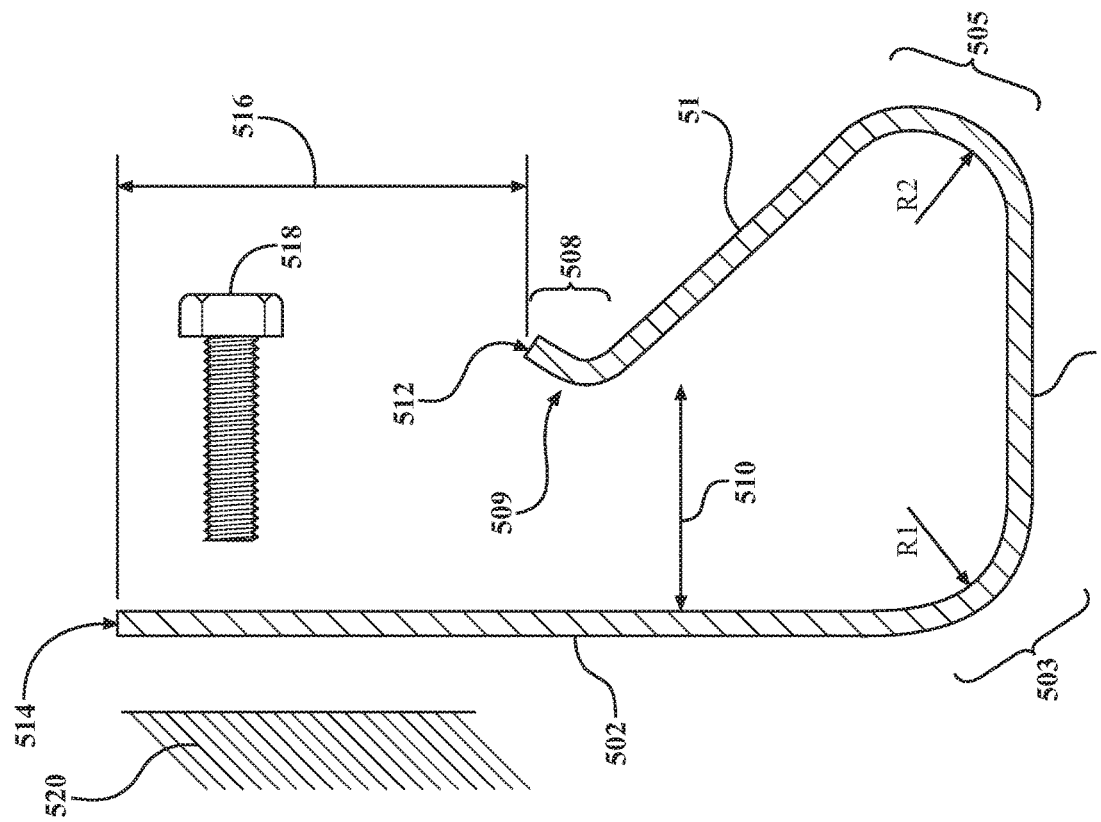
FIG. 5 is a cross-section of a preferred embodiment.

FIG. 5 is a cross-section of the preferred embodiment. The structure comprises a flat back panel 502 that transitions to a flat bottom panel 504. The bottom panel 504 then transitions to a flat front panel 506. In the preferred embodiment, the back and bottom panels are at right angles to one another, whereas the front panel is at an angle of less than 90 degrees with respect to the bottom panel, such that the front panel is oriented toward the back panel, leaving a gap 510 for the insertion of wiring. The top edge of the front panel is preferably bent away from the back panel 502, resulting in a lip 508 having a curved back surface 509 so that the cables and connectors being inserted are not exposed to sharp edges.

Also in the preferred embodiment, the transition between the back panel and the bottom panel is made through a curved section 503 having a radius R1, and the transition between the bottom panel and the front panel is also made through a curved section 505 having a radius R2. R1 and R2 may be the same or different. Note that the upper edge 512 of the lip 508 is intentionally less that the upper edge 514 of the back panel 514 to provide a space 516 enabling fasteners 518 to be driven into roof-mounted rack or rail member 520.

Figure 6:
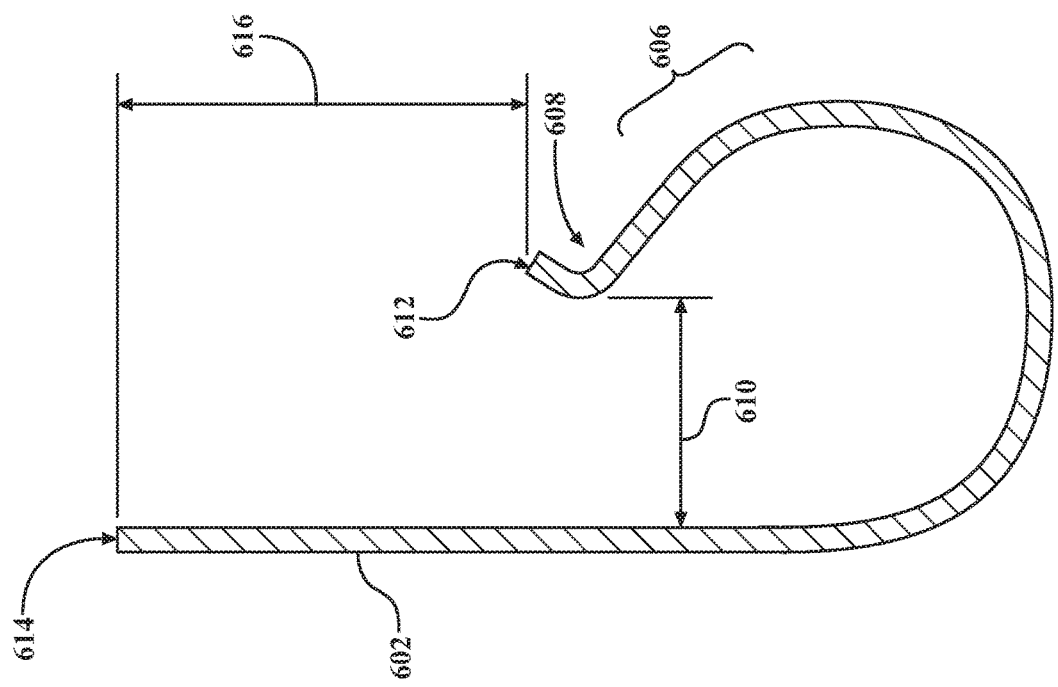
FIG. 6 is a cross-section of an alternative preferred embodiment.

While in the preferred embodiment the bottom and front panels include flat sections, a continuous circular or semicircular curve may instead be used, as shown in FIG. 6. Again, however, the upper edge of the front panel 606 would include a bend at 608 away from a flat back panel 602, and the upper edge 612 would be lower than the upper edge 614 of the back panel to provide a space 616 for fastening to racks or rails. As with gap 510 in FIGS. 4D and 5, gap 610 preferably corresponds to the with of a standard connector such as the MC4, which has a width of 18.8 mm. Accordingly, gaps 510, 610 are preferably slightly less than, equal to, or slightly greater than 18.8 mm, for example, in the range of 18 to 20 mm (or more) or, more particularly, 18-19 mm.

The invention claimed is:

1. A wire management system for a solar panel, the wire management system comprising:
an elongated member composed of sheet metal, and wherein, in cross section, the elongated member includes:
an elongated back panel having a top edge and a bottom region;
an elongated bottom panel having a back region and a front region, wherein the back region of the elongated bottom panel forms a smooth curved transition to the bottom region of the elongated back panel; and
an elongated front panel having a bottom region and a top edge, wherein the bottom region of the elongated front panel forms a smooth curved transition to the front region of the elongated bottom panel and, except for the smooth curved transition to the elongated bottom panel the elongated back panel is flat;
wherein a distance from the elongated bottom panel to the top edge of the elongated back panel is greater than the distance from the elongated bottom panel to the top edge of the elongated front panel;
wherein the elongated front panel is angled toward the elongated back panel, thereby providing an upwardly facing gap into an elongated channel to receive electrical wiring and connectors;
wherein the top edge of the elongated front panel is angled away from the elongated back panel providing a curved lip with a smooth back surface to reduce interference as electrical wiring and connectors are inserted into and removed from the channel;
wherein the elongated bottom panel includes a plurality of spaced-apart slots extending from the elongated back and front panels; and
wherein except for the smooth curved transition to the elongated bottom panel and the curved lip the front panel is flat.

2. The wire management system of claim 1, wherein the elongated member is extruded from a single piece of sheet metal.

3. The wire management system of claim 1, wherein the gap is between 18 and 20 mm.

4. The wire management system of claim 1, wherein the elongated back panel includes a plurality of through holes to receive fasteners for mounting the elongated back panel against an existing rack or rail.

5. A method of organizing the wiring associated with a solar panel installation including a plurality of solar panels mounted to racks or rails fastened to a roof surface, the method comprising:
providing the wire management system of claim 1;
fastening the back panel of the elongated member to one of the racks or rails; and
inserting the wiring associated with the solar panel installation into the elongated channel of the elongated member.

6. The method of claim 5, wherein a length of the elongated member corresponds to a width of one of the plurality of solar panels.

7. The wire management system of claim 1, wherein the elongated member is configured to receive electrical wiring after the elongated member is fixed to the solar panel.

8. The wire management system of claim 1, wherein the elongated back panel includes a through hole for receiving a fastener to connect the elongated member to the solar panel.

9. The wire management system of claim 1, wherein the smooth curved transition between the elongated back panel and elongated bottom panel has a radius R1.

10. The wire management system of claim 1, wherein the smooth curved transition between the elongated front panel and elongated bottom panel has a radius R2.

11. The wire management system of claim 1, wherein the smooth curved transitions share the same radius.

12. The wire management system of claim 1, wherein the smooth transition between the elongated back panel and elongated bottom panel has a radius R1 having a different radius from the smooth transition between the elongated front panel and elongated bottom panel having a radius R2.

13. The wire management system of claim 1, wherein the elongated front panel is a curve radially extending from the smooth curved transition between the elongated bottom panel and elongated front panel.

14. A wire management system for a solar panel, the wire management system comprising:
- an elongated member composed of sheet metal, and wherein, in cross section, the elongated member includes:
- an elongated back panel having a top edge and a bottom region;
- an elongated bottom panel having a back region and a front region, wherein the back region of the elongated bottom panel forms a smooth curved transition to the bottom region of the elongated back panel; and
- an elongated front panel having a bottom region and a top edge, wherein the bottom region of the elongated front panel forms a smooth curved transition to the front region of the elongated bottom panel and, except for the smooth curved transition to the elongated bottom panel the elongated back panel is flat;
- wherein the elongated back panel extends a greater distance from the elongated bottom panel than the elongated front panel and includes a through hole located above the elongated front panel for receiving a fastener;
- wherein the elongated front panel is angled toward the elongated back panel, thereby providing an upwardly facing gap into an elongated channel;
- wherein the top edge of the elongated front panel is angled away from the elongated back panel providing a curved lip with a smooth back surface;
- wherein the elongated bottom panel includes a slot extending from the elongated back and front panels;
- wherein the elongated back panel includes an outer receiving surface that interfaces with an existing rail or rack;
- wherein the elongated bottom panel includes a plurality of spaced-apart slots extending from the elongated back and front panels, each spaced horizontally from one another; and
- wherein the plurality of spaced-apart slots are sized 6 mm and spaced 94 mm from one another.

15. The wire management system of claim 14, wherein the elongated back panel includes a plurality of through holes to receive fasteners for mounting the elongated back panel against an existing rack or rail.

16. A wire management system for a solar panel, the wire management system comprising:
- an elongated member composed of sheet metal, and wherein, in cross section, the elongated member includes:
- an elongated back panel having a top edge and a bottom region;
- an elongated bottom panel having a back region and a front region, wherein the back region of the elongated bottom panel forms a smooth curved transition to the bottom region of the elongated back panel; and
- an elongated front panel having a bottom region and a top edge, wherein the bottom region of the elongated front panel forms a smooth curved transition to the front region of the elongated bottom panel and, except for the smooth curved transition to the elongated bottom panel the elongated back panel is flat;
- wherein the elongated back panel extends a greater distance from the elongated bottom panel than the elongated front panel and includes a plurality of through holes to receive fasteners for mounting the elongated back panel against an existing rack or rail of the solar panel;
- wherein the elongated front panel is angled toward the elongated back panel, thereby providing an upwardly facing gap into an elongated channel to receive electrical wiring and connectors associated with the solar panel, the upwardly facing gap is between 19 mm and 20 mm;
- wherein the top edge of the elongated front panel is angled away from the elongated back panel providing a curved lip with a smooth back surface to reduce interference as electrical wiring and connectors are inserted into and removed from the channel;
- wherein the elongated bottom panel includes a plurality of spaced-apart slots extending from the elongated back and front panels to drain water; and
- wherein the top edge of the elongated back panel aligns with a top edge of the existing rack or rail.

17. The wire management system of claim 16, wherein the elongated bottom panel includes a plurality of spaced-apart slots extending from the elongated back and front panels, each spaced horizontally from one another.

18. The wire management system of claim 17, wherein the plurality of spaced-apart slots are sized 6 mm and spaced 94 mm from one another.

* * * * *